(12) United States Patent
Engeli et al.

(10) Patent No.: US 11,753,705 B2
(45) Date of Patent: Sep. 12, 2023

(54) NI-BASE SUPERALLOY COMPOSITION AND METHOD FOR SLM PROCESSING SUCH NI-BASE SUPERALLOY COMPOSITION

(71) Applicant: General Electric Technology GmbH, Baden (CH)

(72) Inventors: Roman Engeli, Zurich (CH); Thomas Etter, Muhen (CH); Fabian Geiger, Basel (CH)

(73) Assignee: General Electric Technology GmbH, Baden (CH)

( * ) Notice: Subject to any disclaimer, the term of this patent is extended or adjusted under 35 U.S.C. 154(b) by 207 days.

(21) Appl. No.: 17/147,831

(22) Filed: Jan. 13, 2021

(65) Prior Publication Data

US 2021/0140015 A1 May 13, 2021

Related U.S. Application Data

(62) Division of application No. 15/621,133, filed on Jun. 13, 2017, now Pat. No. 10,941,466.

(30) Foreign Application Priority Data

Jun. 13, 2016 (EP) .................................. 16174111

(51) Int. Cl.
*C22C 19/05* (2006.01)
*C22C 19/03* (2006.01)
(Continued)

(52) U.S. Cl.
CPC ............ *C22C 19/057* (2013.01); *B22F 10/00* (2021.01); *B23K 15/0086* (2013.01);
(Continued)

(58) Field of Classification Search
CPC .......... B22F 10/00; B22F 10/20; B22F 10/25; B22F 10/28; B22F 10/32; B23K 15/0086;
(Continued)

(56) References Cited

U.S. PATENT DOCUMENTS

| 4,116,723 A | 9/1978 | Gell et al. | |
|---|---|---|---|
| 2011/0076181 A1* | 3/2011 | Suzuki | .................... C30B 29/52 |
| | | | 164/122.2 |

(Continued)

FOREIGN PATENT DOCUMENTS

| CN | 104988355 A | 10/2015 |
|---|---|---|
| EP | 2886225 A1 | 6/2015 |

(Continued)

OTHER PUBLICATIONS

Hagedorn, Y.C., et al., "Processing of nickel based super alloy MAR 13-15 M-247 by means of High Temperature-Selective Laser Melting (HT-SLM)," High Value Manufacturing Advanced Research Virtual Rapid Prototyping: Proceedings of the 6th International Conference on Advanced Research in Virtual and Rapid Prototyping, pp. 291-295 (2014).

(Continued)

*Primary Examiner* — Dana Ross
*Assistant Examiner* — Joe E Mills, Jr.
(74) *Attorney, Agent, or Firm* — Charlotte Wilson; James Pemrick; Hoffman Warnick LLC

(57) ABSTRACT

A Ni-based superalloy composition to be used for powder-based additive manufacturing (AM) technology, such as selective laser melting (SLM) or electron beam melting (EBM). The cracking susceptibility during an AM process is considerably reduced by controlling the amount of elements, especially Hf, that form low-melting eutectics.

6 Claims, 4 Drawing Sheets

(51) Int. Cl.

| | | |
|---|---|---|
| *C22C 1/04* | (2023.01) | |
| *B22F 10/00* | (2021.01) | |
| *C22C 1/047* | (2023.01) | |
| *B33Y 10/00* | (2015.01) | |
| *B33Y 70/00* | (2020.01) | |
| *B23K 26/342* | (2014.01) | |
| *B23K 15/00* | (2006.01) | |
| *B23K 26/12* | (2014.01) | |
| *C22C 32/00* | (2006.01) | |
| *C22C 1/10* | (2023.01) | |
| *B22F 10/25* | (2021.01) | |
| *B22F 10/28* | (2021.01) | |
| *B22F 10/32* | (2021.01) | |

(52) U.S. Cl.
CPC .......... *B23K 26/123* (2013.01); *B23K 26/342* (2015.10); *B33Y 10/00* (2014.12); *B33Y 70/00* (2014.12); *C22C 1/047* (2023.01); *C22C 1/0433* (2013.01); *C22C 19/03* (2013.01); *C22C 19/05* (2013.01); *B22F 10/25* (2021.01); *B22F 10/28* (2021.01); *B22F 10/32* (2021.01); *C22C 1/10* (2013.01); *C22C 32/0052* (2013.01)

(58) Field of Classification Search
CPC .. B23K 26/123; B23K 26/342; C22C 1/0433; C22C 1/0491; C22C 1/10; C22C 19/03; C22C 19/05; C22C 19/057; C22C 32/0052; B33Y 10/00; B33Y 70/00; Y02P 10/25

See application file for complete search history.

(56) References Cited

U.S. PATENT DOCUMENTS

| | | |
|---|---|---|
| 2014/0034626 A1 | 2/2014 | Illston |
| 2015/0273631 A1* | 10/2015 | Kenney ................. B29C 64/153 |
| | | 219/76.1 |
| 2015/0344994 A1 | 12/2015 | Etter et al. |

FOREIGN PATENT DOCUMENTS

| | | |
|---|---|---|
| GB | 2153845 A | 8/1985 |
| JP | 2015072007 A | 4/2015 |
| WO | 2013087515 A1 | 6/2013 |

OTHER PUBLICATIONS

Zhang, J., et al., "Effect of hafnium on the castability of directionally solidified nickel-base superallovs," MEKU, vol. 93, No. 8, pp. 806-811 (Aug. 2002) (Abstract).

Extended European Search Report and Opinion issued in connection with corresponding EP Application No. 16174111.1, 9 pages, dated Nov. 30, 2016.

U.S. Appl. No. 15/621,133 Non-Final Office Action dated May 29, 2020, 18 pages.

U.S. Appl. No. 15/621,133 Final Office Action dated Sep. 15, 2020, 14 pages.

U.S. Appl. No. 15/621,133, Notice of Allowance dated Dec. 30, 2020, 16 pages.

Japanese Office Action, 18 pages, dated Apr. 9, 2021.

* cited by examiner ized, which is challenging due to# NI-BASE SUPERALLOY COMPOSITION AND METHOD FOR SLM PROCESSING SUCH NI-BASE SUPERALLOY COMPOSITION This Application is a Divisional Application of U.S. Ser. No. 15/621,133, the entire contents of which are fully incorporated herein.

BACKGROUND

Embodiments of the present invention refers to Ni-based superalloys. It relates to a Ni-based superalloy composition. It further relates to a method for SLM processing such a Ni-based superalloy composition.

Selective laser melting of $\gamma'$ (Gamma Prime) Ni3 (Al, Ti) hardened Ni-based superalloys is challenging because these superalloys are very susceptible to hot-cracking.

Especially alloys with a high content of $\gamma'$ (Gamma Prime) phase in the $\gamma$-matrix, such as MarM247, CM247LC, CMSX486, René80, René108 or MD2, result in extensive hot cracking during Selective Laser Melting (SLM).

For example, the nominal chemical composition of CM247LC is (in wt.-%): 9.5 W, 9.2 Co, 8.1 Cr, 5.6 Al, 3.2 Ta, 1.4 Hf, 0.7 Ti, 0.5 Mo, 0.075 C, 0.015 Zr, 0.015 B, and the balance Ni (see US 2014/034626 A1) and the nominal chemical composition of MarM247 is (in wt.-%): 10.0 W, 10.0 Co, 8.4 Cr, 5.5 Al, 3.0 Ta, 1.5 Hf, 1.0 Ti, 0.7 Mo, 0.15 C, 0.05 Zr, 0,015 B, and the balance Ni.

This high hot-cracking susceptibility impedes the industrialization of SLM of this alloy class, which would be strongly required for high temperature applications, especially in the gas turbine industry.

Different approaches have been proposed to decrease hot cracking in this kind of superalloys: The technology of producing three-dimensional articles by means of powder bed-based additive manufacturing, such as selective laser melting (SLM) or electron beam melting (EBM). Especially, a high oxidation resistant and high gamma-prime ($\gamma'$) precipitation containing Ni-based superalloy powder on basis of IN738LC with a modified chemical composition. Such powder has the following chemical composition (in wt.-%): 15.7-16.3 Cr, 8.0-9.0 Co, 1.5-2.0 Mo, 2.4-2.8 W, 1.5-2.0 Ta, 3.2-3.7 Al, 2.2-3.7 Ti, 0.6-1.1 Nb, 0.09-0.13 C, 0.007-0.012 B, 0.004<Zr<0.03, 0.001<Si<0.03, remainder Ni and unavoidable residual elements, and in addition d size distribution between 10 and 100 μm and a spherical morphology. As an advantage nearly crack free three-dimensional articles can be produced with more productive process parameters and without complicated and time consuming variations of the additive manufacturing processes (e.g. pre-heating) and/or post processing (e.g. hot isostatic pressing HIP).

However, reduction and control of minor elements in an alloy similar to IN738LC, especially of Si and Zr, that were found to strongly promote hot cracking cannot completely avoid hot cracking in higher $\gamma'$ (Gamma Prime) containing alloys.

Application of hot isostatic pressing (HIP) after SLM to close existing hot cracks in the part. For extensive cracking, this might reduce the mechanical properties due to oxide formation at prior hot crack sites; furthermore, it does not allow to close cracks open to the surface. A process has been disclosed (see document U.S. Pat. No. 8,506,836) to solve this issue by a sequence of coating and hot isostatic pressing steps, which is however cost expensive and is thus not economic.

Processing of the $\gamma'$ (Gamma Prime) strengthened alloy MarM247 by SLM at very high temperatures around 1200° C. have been shown to result in completely crack-free parts. In the current setup, only the substrate is heated and thus, the processing temperature decreases with increasing build height due to the increasing distance from the substrate. Thus, the process is currently limited to small parts. A complete redesign of the SLM equipment is required if the process is to be industrialized, which is challenging due to the high temperatures involved. Additionally, a strong sintering of the powder is expected at such high temperatures. The removal of the sintered, but unmelted powder is time consuming. Furthermore, it is probably impossible to create thin, internal structures such as cooling holes, because the sintered powder can hardly be removed. Thus, the surface quality, accuracy and geometric freedom is likely to be reduced in such a process. An additional drawback might be a strong oxidation of the powder during processing, which might inhibit the recyclability and thus increases material costs.

The use of electron beam melting (EBM) has been found to allow processing such alloys without hot cracking. This process is also done at high temperature and has therefore similar limitations as discussed above (though it is done under vacuum and powder oxidation is thus reduced). EBM however has a lower accuracy, results in a much lower surface quality and cannot generate as small features as SLM, because the partially sintered powder can hardly be removed from internal cavities.

Consequently, the existing solutions do either not solve the problem or are very uneconomic, and thus impede the industrialization of the SLM process for $\gamma'$(Gamma Prime) hardened superalloys.

SUMMARY

It is thus an object of the present invention to provide a Ni-based superalloy composition, which has the capability to build a $\gamma/\gamma'$-microstructure after a heat treatment and which considerably reduces the cracking susceptibility of the alloy during an additive manufacturing (AM) process such as selective laser melting (SLM), electron beam melting (EBM), laser metal forming (LMF), laser engineered net shape (LENS) or direct metal deposition (DMD), for manufacturing three dimensional articles with such a $\gamma/\gamma'$-microstructure.

It is a further object of an embodiment of the invention to teach a method for SLM processing such a Ni-based superalloy composition.

These objects are achieved by an alloy composition according to claim 1 and a method according to claim 13.

According to embodiments of the invention the Ni-based superalloy composition is characterized in that the cracking susceptibility during an AM process is considerably reduced by controlling the amount of elements that form low-melting eutectics.

According to an embodiment of the invention said superalloy composition is especially provided for powder bed-based additive manufacturing (SLM, EBM) and comprises first elements not bound in precipitates and said first elements form low-melting eutectics. The amount of said first elements is increased with respect to standard compositions. The term standard composition refers to the chemical composition of so far commercial available Ni-based superalloys.

Especially, said first elements comprise Hafnium (Hf). Said first elements may also comprise Zr or B.

Specifically, said first elements may comprise Hf with an Hf content in the range 1.2 wt-%<Hf<5 wt-%.

More specifically, said first elements may comprise Hf with an Hf content in the range 1.6 wt-%<Hf<3.5 wt-%.

Even more specifically, said first elements may comprise Hf with an Hf content in the range 1.7 wt-%<Hf<2.8 wt-%.

Said superalloy composition may contain a minimum amount of >1.2 wt-% Hf, and that C is present with a Hf [at-%]/C [at-%] ratio>1.55.

Specifically, C is present with a Hf [at-%]/C [at-%] ratio>1.91.

In both cases, C may be present with C>0.01 wt-% for grain boundary strengthening.

Especially, C may be present with 0.01 wt-%<C<0.2 wt-%.

Controlling and adjustment of the amount of above mentioned elements in the alloy leads to the advantages of the invention. By realizing the disclosed Hf [at-%]/C [at-%] ratios Hf is not completely bound in carbide precipitations and the "free" Hf is able to form low-melting eutectics.

According to another embodiment of the invention said Ni-based superalloy is a modified version (with an higher amount of Hf of 2.4 wt.-%) of CM247LC which has a nominal composition of (in wt.-%): 9.5W, 9.2 Co, 8.1 Cr, 5.6 Al, 3.2 Ta, 1.4 Hf, 0.7 Ti, 0.5 Mo, 0.075 C, 0.015 Zr, 0.015 B, and the balance Ni. The Hf [at-%]/C [at-%] ratio is 2.2 for the modified version according to the invention and 1.3 for the alloy with a nominal composition.

According to an additional embodiment of the invention said Ni-based superalloy is a modified version (especially with a higher amount of Hf) of MarM247, which has a nominal composition of (in wt.-%): 10.0 W, 10.0 Co, 8.4 Cr, 5.5 Al, 3.0 Ta, 1.5 Hf, 1.0 Ti, 0.7 Mo, 0.15 C, 0.05 Zr, 0.015 B, and the balance Ni. The Hf [at-%]/C [at-%] ratio is only 0.67 for the MarM247 alloy with a nominal composition.

The method for SLM processing a Ni-based superalloy composition according to the invention is characterized in that to prevent binding of free Hf in oxides, the SLM process is performed under protective atmosphere with O2<1% with an O2 content in the powder being <800 ppm.

Specifically, the SLM process is performed under protective atmosphere with O2<0.6% with the O2 content in the powder being <500 ppm.

More specifically, the SLM process is performed under protective atmosphere with O2<0.4% with the O2 content in the powder being <300 ppm.

BRIEF DESCRIPTION OF THE DRAWINGS

Embodiments of the present invention is now to be explained more closely by means of different embodiments and with reference to the attached drawings.

DETAILED DESCRIPTION

Figure 1:
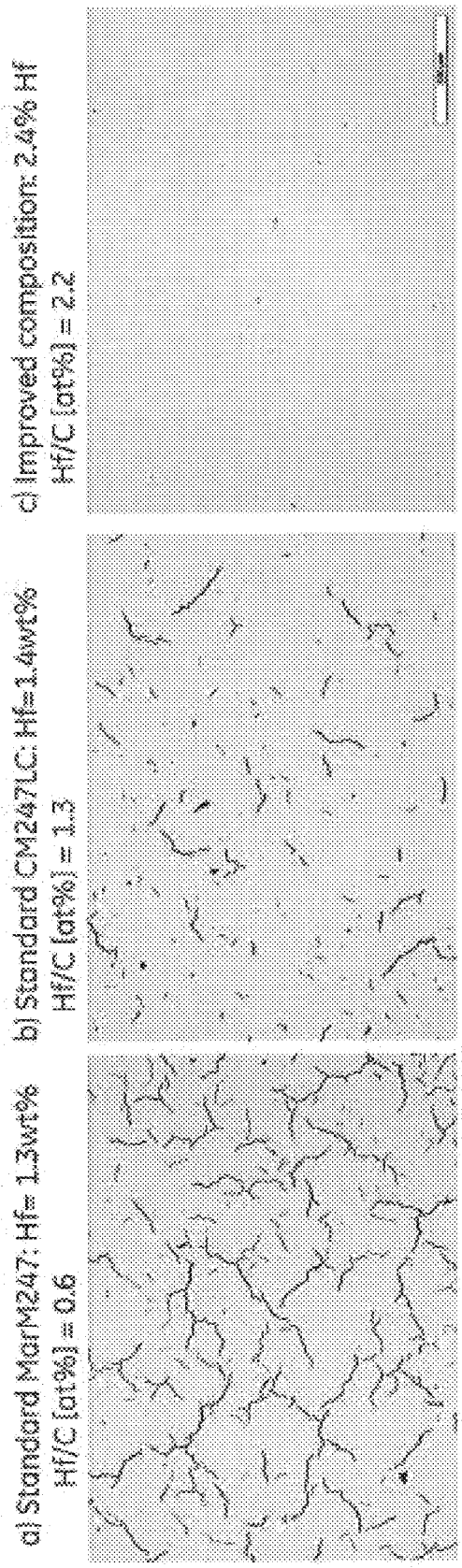
FIG. 1 shows in comparison microsections of three different SLM-processed alloys in as-built state (using same processing parameters & conditions) with (a) being related to standard MarM247, (b) being related to standard CM247LC, and (c) being related to an improved alloy composition.

Embodiments of the invention relate especially to a Ni-based superalloy composition to be used for powder bed-based additive manufacturing (AM) technology, such as selective laser melting (SLM) or electron beam melting (EBM). However, the claimed Ni-based superalloy could also improve weldability in other AM technologies such as laser metal deposition (LMD) or laser metal forming (LMF) (blown powder methods).

In general, according to the invention the cracking susceptibility during AM processes can be considerably reduced by controlling the amount of elements that form low-melting eutectics.

Hot cracking occurs when the volume shrinkage between two solidification fronts, caused by solidification and thermal strains, cannot be compensated by fluid flow from the main melt pool. This fluid flow ("backfilling") strongly depends on the permeability of the dendrite network, which is influenced by the last stage solidification behavior.

Embodiments of the present invention intends to increase the ability of the alloy for this backfilling process and thus decrease the amount of hot cracks during AM/SLM processing.

Embodiments of the present invention achieves this by increasing the amount of "free" (i.e. not bound in precipitates) elements that form low-melting eutectics, especially Hf. This increases the volume fraction of liquid that is present until the last stage of solidification and thus results in a larger dendrite separation and higher permeability.

Hot cracks, which might start to form due to the presence of essential elements such as Zr can thus be backfilled and closed directly during solidification.

Hf is a very strong carbide and oxide former. Hf carbides and oxides are formed from the melt very early in the solidification and a lot of the Hf is thus fixed in carbides/oxides before the critical phase of the solidification.

In order to reduce hot cracking, an alloy composition is thus proposed that contains a minimum amount of 1.2 wt % Hf, comprises C and has a Hf [at %]/C [at %] ratio>1.55.

Especially, said alloy composition is a modified version of the commercial available CM247LC alloy (nominal composition (in wt.-%): 9.5 W, 9.2 Co, 8.1 Cr, 5.6 Al, 3.2 Ta, 1.4 Hf, 0.7 Ti, 0.5 Mo, 0.075 C, 0.015 Zr, 0.015 B, and the balance Ni) with a higher Hf content (2.4 wt.-% instead of 1.4 wt.-%). The Hf [at %]/C [at %] ratio for that nominal chemical composition is 1.3, for the modified composition that ratio is 2.2.

According to an additional embodiment of the invention said Ni-based superalloy is a modified version (especially with a higher amount of Hf) of MarM247, which has a nominal composition of (in wt.-%): 10.0 W, 10.0 Co, 8.4 Cr, 5.5 Al, 3.0 Ta, 1.5 Hf, 1.0 Ti, 0.7 Mo, 0.15 C, 0.05 Zr, 0.015 B, and the balance Ni. The Hf [at-%]/C [at-%] ratio is only 0.67 for the MarM247 alloy with a nominal composition.

Alloys that fulfil these requirements show a sufficient volume of terminal liquid to allow backfilling of emerging hot cracks and thus show very low hot cracking susceptibility during SLM processing.

To prevent binding of free Hf in oxides, the SLM process must be additionally performed under protective atmosphere with O2<1%, in an embodiment <0,6% and more particularly 0,4%, and the O2 content in the powder must be <800 ppm, in an embodiment <500 ppm, and more particularly <300 ppm. For grain boundary strengthening, the C content must be >0.01 wt %.

FIG. 1 shows three microsections from different alloys processed by SLM. While the two standard alloys (a) and (b) are very susceptible to hot cracking, the experimental alloy according to an embodiment of the present invention does not show any hot cracking. All three alloys were fabricated using identical process parameters/conditions.

Figure 2:
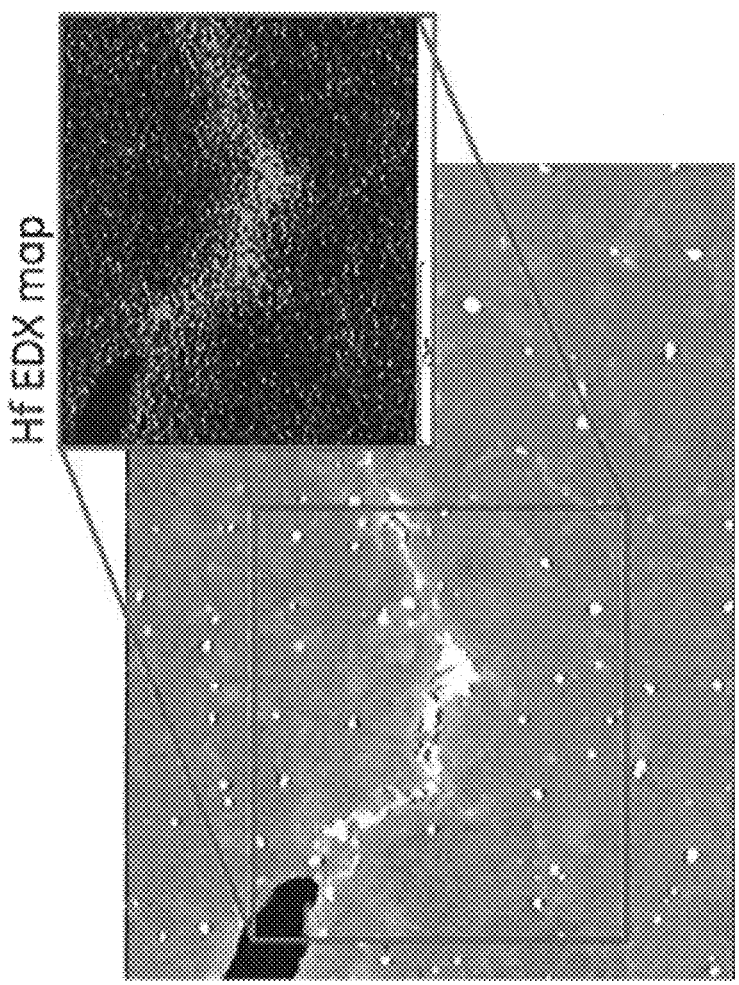
FIG. 2 shows an SEM micrograph with EDX map of an alloy showing evidence for backfilling of cracks by a Hf rich melt.

FIG. 2 shows a scanning electron microscope image with the EDX map insert exhibiting a Hf rich intergranular area which originated from the backfilling of an emerging hot crack by the Hf rich terminal liquid.

Figure 3:
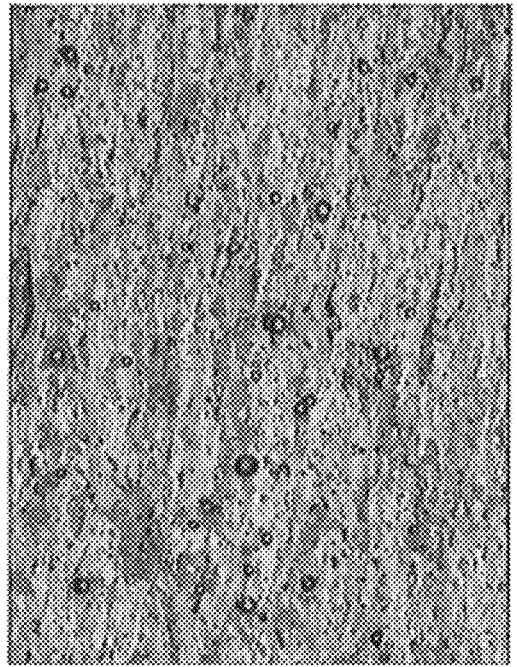
FIG. 3 shows a micrograph of a side surface of an SLM processed part made out of (a) standard CM247LC and (b) optimized alloy (both samples are processed under equal conditions); while the standard composition (a) results in a large number of cracks open to the surface, a crack-free surface is obtained with the optimized alloy composition (b)
Figure 3:
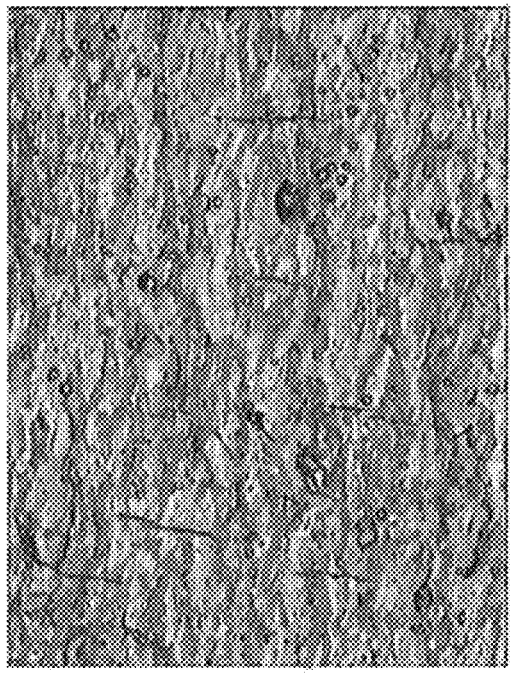

FIG. 3 shows a micrograph of a side surface of an SLM processed part made out of (a) standard CM247LC and (b) optimized alloy according to an embodiment of the present invention (both samples are processed under equal conditions). As can be seen, SLM fabricated parts from alloys according to embodiments of the present invention (b) do not show cracks open to the surface, which is important as these cracks are especially difficult to remove and might decrease fatigue properties. The standard CM247LC alloy (a), on the other hand, shows numerous surface cracks when processed under the same conditions.

Figure 4:
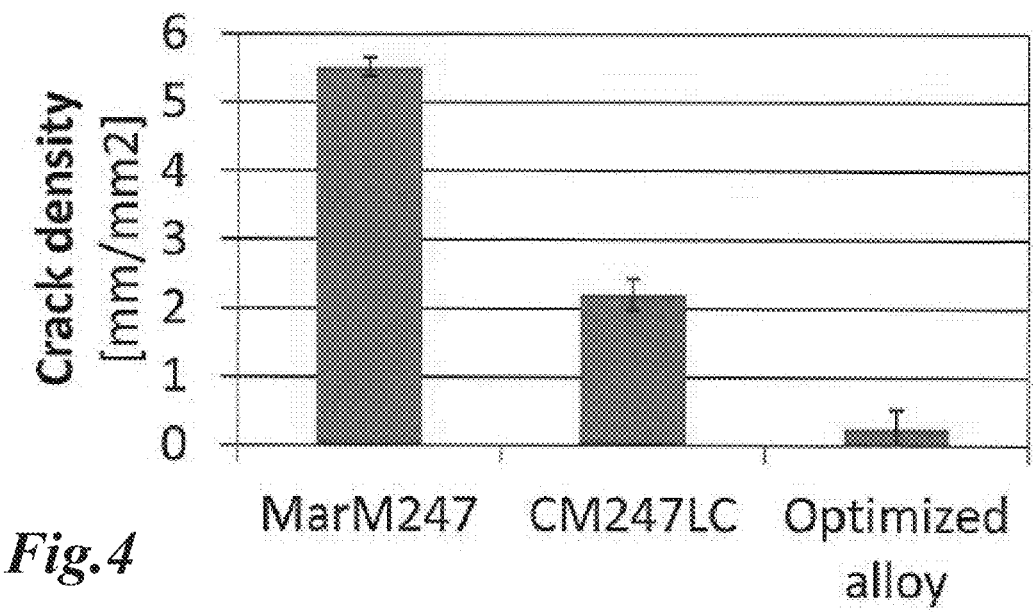
FIG. 4 shows the reduction of hot cracking (cracking density) by an optimized alloy composition in comparison to standard alloys.

FIG. 4 shows the results from a quantitative crack analysis for different alloys processed by SLM using identical conditions. An optimized alloy composition according to embodiments of the invention is compared to two standard alloys. The experimental (optimized) alloy according to embodiments of the present invention shows a considerably decreased hot cracking susceptibility.

Figure 5:
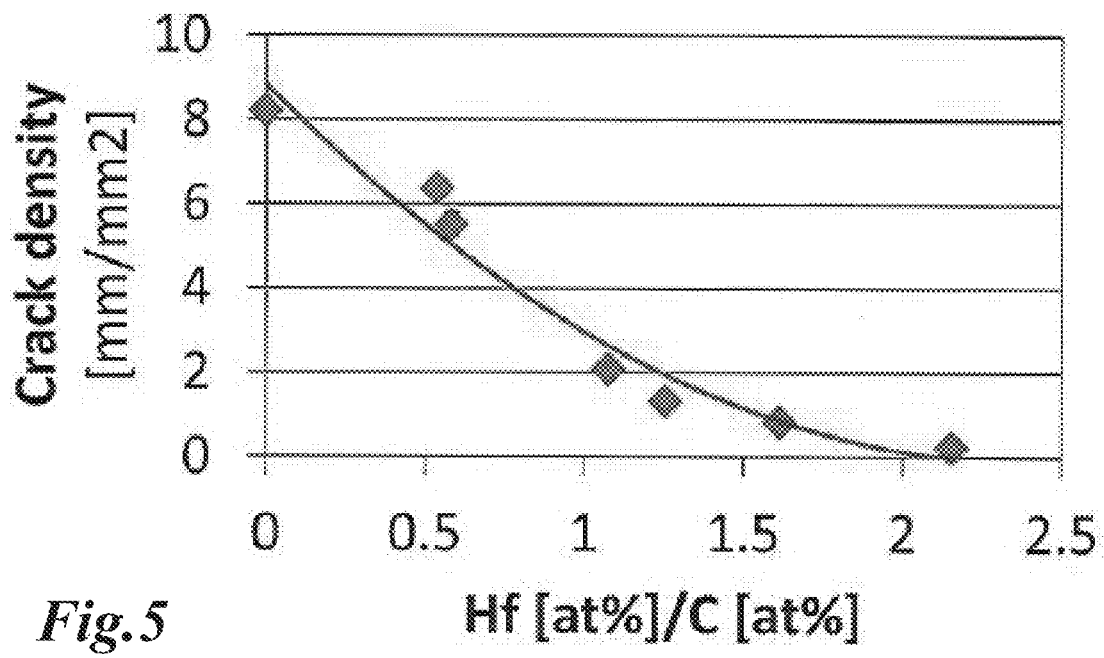
FIG. 5 shows the reduction of hot cracking with increasing Hf/C ratio of the alloy.

FIG. 5 shows the reduction of the hot cracking susceptibility with increasing Hf/C fraction in a range of the ratio from zero to 2.2, where the crack density almost vanishes.

Addition of Hf to cast alloys to improve the castability is state of the art. However, for cast material, the addition of Hf has some severe limitations: First, Hf segregates strongly during solidification and forms eutectic structures with very low solidification temperature. This strongly increases the likelihood of incipient melting during subsequent heat treatment. Second, Hf is very reactive and can strongly react with the mould used in investment casting.

Thus, the Hf content is typically limited to ~1.5% in cast alloys. However, these limitations are not present for the SLM process, because the rapid solidification that takes place limits the Hf segregation and the size of the low melting eutectic structures. These very small segregations of size smaller than some hundred nm are homogenized already during heat up and incipient melting is thus not an issue. The high reactivity of Hf in the melt is no issue due to the direct generation of parts from the powder bed by SLM.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A Ni-based superalloy composition comprising:
   a γ/γ'-microstructure, responsive to a heat treatment, that renders the Ni-based superalloy composition suitable for additive manufacturing (AM) of three dimensional articles with a γ/γ'-microstructure; and
   first elements selected from a group of elements that are known to form low-melting eutectics, wherein an amount of each of the first elements is controlled to a level selected to reduce risk of crack formation during AM, and wherein the Ni-based superalloy composition is a modified version of CM247LC with a chemical composition of (in wt.-%): 9.5 W, 9.2 Co, 8.1 Cr, 5.6 Al, 3.2 Ta, 2.4 Hf, 0.7 Ti, 0.5 Mo, 0.075 C, 0.015 Zr, 0.015 B, and the balance Ni.

2. A Ni-based superalloy composition comprising:
   a γ/γ'-microstructure, responsive to a heat treatment, that renders the Ni-based superalloy composition suitable for additive manufacturing (AM) of three dimensional articles with a γ/γ'-microstructure; and
   first elements selected from a group of elements that are known to form low-melting eutectics, wherein an amount of each of the first elements is controlled to a level selected to reduce risk of crack formation during AM, and wherein the Ni-based superalloy composition is a modified version of MarM247 with a chemical composition of (in wt.-%): 10.0 W, 10.0 Co, 8.4 Cr, 5.5 Al, 3.0 Ta, 2.4 Hf, 1.0 Ti, 0.7 Mo, 0.15 C, 0.05 Zr, 0.015 B, and the balance Ni.

3. A method for SLM processing a Ni-based superalloy composition, the method comprising:
   providing the Ni-based superalloy composition configured to form a γ/γ'-microstructure after a heat treatment and used for additive manufacturing of three dimensional articles with a γ/γ'-microstructure, wherein the amount of elements that form low-melting eutectics is controlled;
   using the Ni-based superalloy composition in powder bed-based additive manufacturing technology and the Ni-based superalloy composition comprises first elements not bound in precipitates forming low-melting eutectics, wherein the first elements are Hf in an amount of at least 1.2 wt %;
   providing protective atmosphere with O2 less than 1% with an O2 content in the powder being less than 800 ppm
   performing the powder bed-based additive manufacturing technology.

4. The method according to claim 3, wherein the protective atmosphere comprises O2 less than 0.6% with the O2 content in the powder being less than 500 ppm.

5. The method according to claim 4, wherein the protective atmosphere comprises O2 less than 0.4% with the O2 content in the powder being less than 300 ppm.

6. The Ni-base superalloy composition according to claim 1, wherein a ratio of Hf [at-%]/C [at-%] is greater than 1.3 and less than 2.3.

* * * * *